United States Patent
Rodrigues et al.

(10) Patent No.: US 12,536,680 B2
(45) Date of Patent: Jan. 27, 2026

(54) TRAINING APPARATUS, CONTROL METHOD, AND NON-TRANSITORY COMPUTER-READABLE STORAGE MEDIUM

(71) Applicant: NEC Corporation, Tokyo (JP)

(72) Inventors: Royston Rodrigues, Tokyo (JP); Masahiro Tani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 382 days.

(21) Appl. No.: 18/273,612

(22) PCT Filed: Apr. 8, 2021

(86) PCT No.: PCT/JP2021/014936
§ 371 (c)(1),
(2) Date: Jul. 21, 2023

(87) PCT Pub. No.: WO2022/215236
PCT Pub. Date: Oct. 13, 2022

(65) Prior Publication Data
US 2024/0087146 A1 Mar. 14, 2024

(51) Int. Cl.
*G06K 9/00* (2022.01)
*G06T 7/35* (2017.01)

(52) U.S. Cl.
CPC ...... *G06T 7/35* (2017.01); *G06T 2207/10032* (2013.01); *G06T 2207/20081* (2013.01)

(58) Field of Classification Search
CPC ............ G06T 7/35; G06T 2207/10032; G06T 2207/20081; G06T 2207/20076;
(Continued)

(56) References Cited

U.S. PATENT DOCUMENTS 10,452,927 B2 * 10/2019 Stojanović ............ G06V 20/13
10,767,996 B2 * 9/2020 Mohr ..................... G06N 3/08
(Continued)

FOREIGN PATENT DOCUMENTS

EP 3660737 A1 * 6/2020 ............ G06V 20/70
JP 2011-002892 A 1/2011
(Continued)

OTHER PUBLICATIONS

International Search Report for PCT Application No. PCT/JP2021/014936, mailed on Jun. 1, 2021.
(Continued)

*Primary Examiner* — Shervin K Nakhjavan
(74) *Attorney, Agent, or Firm* — Sughrue Mion, PLLC

(57) ABSTRACT

A training apparatus (2000) acquires a ground-view image (20), an aerial-view image (30), and alignment information (50), and trains a discriminator (10) that extracts a plurality of partial aerial regions (40) from the aerial-view image (30) and determines that the ground-view image (20) matches the aerial-view image (30) when there is the partial aerial region (40) that matches the ground-view image (20). The training apparatus (2000) extracts a correctly-aligned partial aerial region (42) and a mis-aligned partial aerial region (44) from the aerial-view image (30). The correctly-aligned partial aerial region (42) is indicated by the alignment information (50) and corresponds to the ground-view image (20). The mis-aligned partial aerial region (44) partially overlaps the correctly-aligned partial aerial region (42). The training apparatus (2000) trains the discriminator (10) using both the correctly-aligned partial aerial region (42) and the mis-aligned partial aerial region (44) as positive examples.

15 Claims, 9 Drawing Sheets

(58) Field of Classification Search
CPC ............ G06T 2207/20084; G06T 7/30; G06N 3/0464; G06N 3/09; G06N 3/08; G06N 20/00

See application file for complete search history.

(56) References Cited

U.S. PATENT DOCUMENTS

| | | | |
|---|---|---|---|
| 11,244,500 B2* | 2/2022 | Marschner | G01S 17/89 |
| 11,655,028 B2* | 5/2023 | Al Qizwini | G08G 5/55 |
| | | | 382/103 |
| 11,657,072 B2* | 5/2023 | Van Sickle | G06N 3/0464 |
| | | | 701/450 |
| 11,669,998 B2* | 6/2023 | Lee | G06N 3/0455 |
| | | | 382/103 |
| 11,741,702 B2* | 8/2023 | Dins | G01S 13/89 |
| | | | 382/103 |
| 2019/0050648 A1* | 2/2019 | Stojanovic | G06V 20/13 |
| 2020/0146203 A1* | 5/2020 | Deng | G06V 20/13 |

FOREIGN PATENT DOCUMENTS

| | | |
|---|---|---|
| JP | 2018-092628 A | 6/2018 |
| JP | 2019-028560 A | 2/2019 |
| JP | 2019-078620 A | 5/2019 |

OTHER PUBLICATIONS

Written opinion for PCT Application No. PCT/JP2021/014936, mailed on Jun. 1, 2021.

Yujiao Shi, Xin Yu, Dylan Campbell, and Hongdong Li, "Where am I looking at? Joint Location and Orientation Estimation by Cross-View Matching", Computer Research Repository, arXiv:2005.03860, May 8, 2020.

Sixing Hu et al., "CVM-Net: Cross-View Matching Network for Image-Based Ground-to-Aerial Geo-Localization", Proceedings of the IEEE Conference on Computer Vision and Pattern Recognition 2018, Jun. 18, 2018, p. 7258-7267.

Tsung-Yi Lin et al., "Learning Deep Representations for Ground-to-Aerial Geolocalization", Proceedings of the IEEE Conference on Computer Vision and Pattern Recognition 2015, Jun. 7, 2015, p. 5007-5015.

JP Office Action for JP Application No. 2023-561314, mailed on Aug. 6, 2024 with English Translation.

* cited by examiner

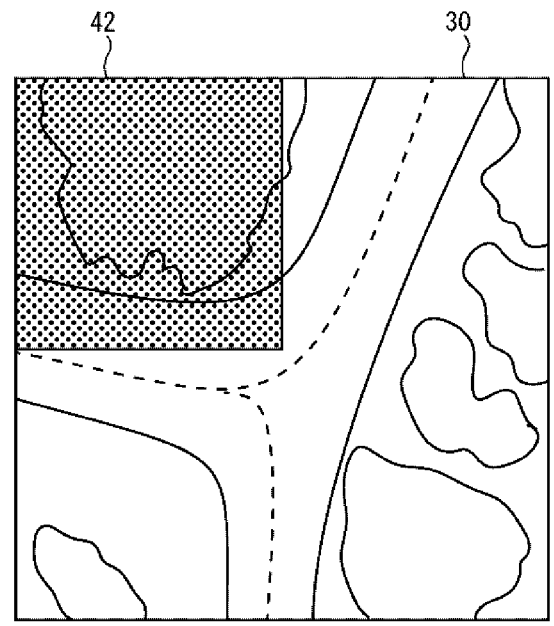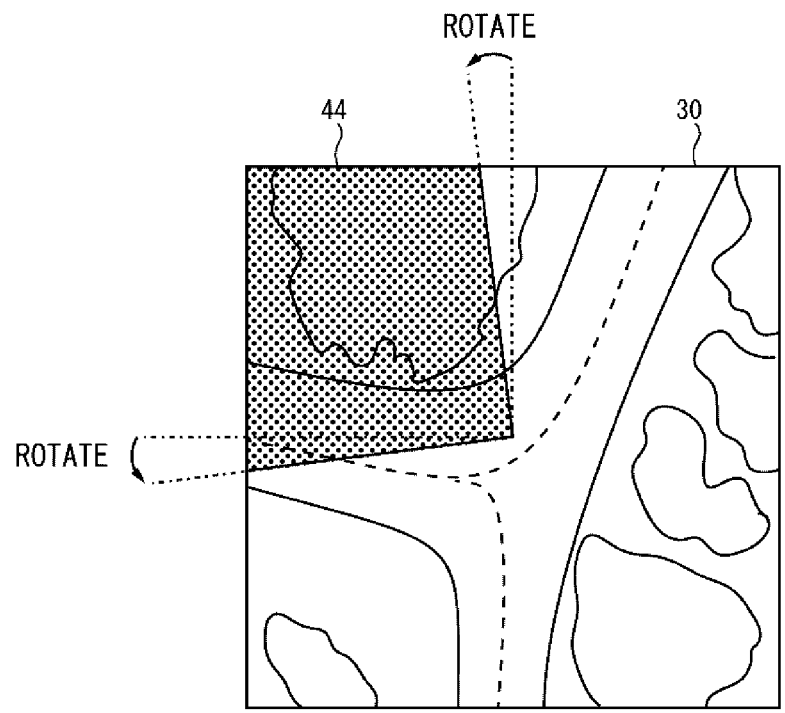
Fig. 3

TRAINING APPARATUS, CONTROL METHOD, AND NON-TRANSITORY COMPUTER-READABLE STORAGE MEDIUM

This application is a National Stage Entry of PCT/JP2021/014936 filed on Apr. 8, 2021, the contents of all of which are incorporated herein by reference, in their entirety.

TECHNICAL FIELD

The present disclosure generally relates to image matching, in particular, matching between a ground-view image and an aerial-view image.

BACKGROUND ART

A computer system that performs ground-to-aerial cross-view matching (matching between a ground-view image and an aerial-view image) has been developed. For example, NPL1 discloses a system comprising a set of CNNs (Convolutional Neural Networks) to match a ground-view image whose field of view is less than 3600 against an aerial-view image.

Specifically, one of the CNNs acquires a ground-view image and extracts features therefrom. The other one acquires a polar-transformed aerial-view image, and extracts features therefrom. Then, the system estimates the orientation alignment of the ground-view image with respect to the aerial-view image by computing the correlation between the features extracted from the ground-view image and those extracted from the aerial-view image. Based on the orientation alignment, the system shifts and crops out a section of the features of the aerial-view image that is estimated to correspond to the ground-view image. Then, the features of the ground-view image are compared with the cropped features of the aerial-view image to determine whether the ground-view image matches the aerial-view image.

CITATION LIST

Non Patent Literature

NPL1: Yujiao Shi, Xin Yu, Dylan Campbell, and Hongdong Li, "Where am I looking at? Joint Location and Orientation Estimation by Cross-View Matching," Computer Research Repository, arXiv:2005.03860, May 8, 2020

SUMMARY OF INVENTION

Technical Problem

In NPL1, it is assumed that all training data are prepared in advance to train a set of the networks that performs matching between a ground-view image whose field of view is less than 3600 and an aerial-view image. An objective of the present disclosure is to provide an effective way to train a discriminator that performs matching between a ground-view image whose field of view is less than 3600 and an aerial-view image.

Solution to Problem

The present disclosure provides a training apparatus that comprises at least one processor and memory storing instructions. The at least one processor is configured to execute the instructions to: acquire a ground-view image whose field of view is less than 360 degree, an aerial-view image, and alignment information; and train a discriminator that determines whether or not the ground-view image matches the aerial-view image, the discriminator extracting a plurality of partial aerial regions from the aerial-view image and determining that the ground-view image matches the aerial-view image when there is the partial aerial region that matches the ground-view image.

The training of the discriminator includes: extracting a correctly-aligned partial aerial region and a mis-aligned partial aerial region from the aerial-view image, the correctly-aligned partial aerial region being the partial aerial region that is indicated by the alignment information and that corresponds to the ground-view image, the mis-aligned partial aerial region being the partial aerial region partially overlapping the correctly-aligned partial aerial region; training the discriminator using a set of the ground-view image and the correctly-aligned partial aerial region and a set of the ground-view image and the mis-aligned partial aerial region, both the correctly-aligned partial aerial region and the mis-aligned partial aerial region being used as positive examples of the partial aerial region.

The present disclosure further provides a control method that is performed by a computer. The control method comprises: acquiring a ground-view image whose field of view is less than 360 degree, an aerial-view image, and alignment information; and training a discriminator that determines whether or not the ground-view image matches the aerial-view image, the discriminator extracting a plurality of partial aerial regions from the aerial-view image and determining that the ground-view image matches the aerial-view image when there is the partial aerial region that matches the ground-view image.

The training of the discriminator includes: extracting a correctly-aligned partial aerial region and a mis-aligned partial aerial region from the aerial-view image, the correctly-aligned partial aerial region being the partial aerial region that is indicated by the alignment information and that corresponds to the ground-view image, the mis-aligned partial aerial region being the partial aerial region partially overlapping the correctly-aligned partial aerial region; training the discriminator using a set of the ground-view image and the correctly-aligned partial aerial region and a set of the ground-view image and the mis-aligned partial aerial region, both the correctly-aligned partial aerial region and the mis-aligned partial aerial region being used as positive examples of the partial aerial region.

The present disclosure further provides a non-transitory computer readable storage medium storing a program. The program that causes a computer to execute: acquiring a ground-view image whose field of view is less than 360 degree, an aerial-view image, and alignment information; and training a discriminator that determines whether or not the ground-view image matches the aerial-view image, the discriminator extracting a plurality of partial aerial regions from the aerial-view image and determining that the ground-view image matches the aerial-view image when there is the partial aerial region that matches the ground-view image.

The training of the discriminator includes: extracting a correctly-aligned partial aerial region and a mis-aligned partial aerial region from the aerial-view image, the correctly-aligned partial aerial region being the partial aerial region that is indicated by the alignment information and that corresponds to the ground-view image, the mis-aligned partial aerial region being the partial aerial region partially overlapping the correctly-aligned partial aerial region; training the discriminator using a set of the ground-view image and the correctly-aligned partial aerial region and a set of the ground-view image and the mis-aligned partial aerial region, both the correctly-aligned partial aerial region and the mis-aligned partial aerial region being used as positive examples of the partial aerial region.

Advantageous Effects of Invention

According to the present disclosure, it is possible to provide an effective way to train a discriminator that performs matching between a ground-view image whose field of view is less than 3600 and an aerial-view image.

BRIEF DESCRIPTION OF DRAWINGS

FIG. 3 illustrates an example of a correctly-aligned partial aerial region and a mis-aligned partial aerial region.

DESCRIPTION OF EMBODIMENTS

Example embodiments according to the present disclosure will be described hereinafter with reference to the drawings. The same numeral signs are assigned to the same elements throughout the drawings, and redundant explanations are omitted as necessary. In addition, predetermined information (e.g. a predetermined value or a predetermined threshold) is stored in advance in a storage device to which a computer using that information has access unless otherwise described.

First Example Embodiment

<Overview>

Figure 1:
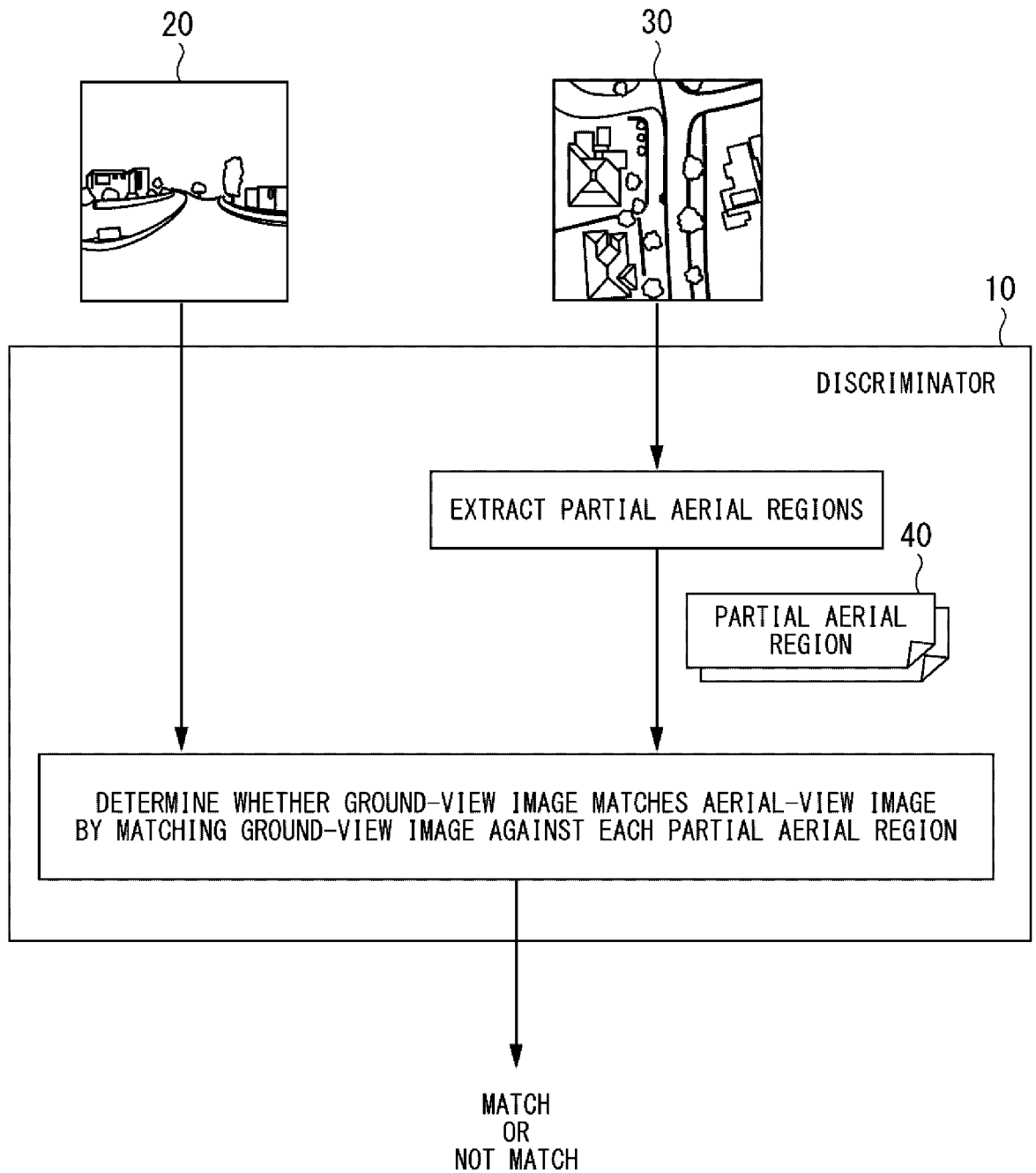
FIG. 1 illustrates a discriminator trained by a training apparatus of the first example embodiment.

A training apparatus of the first example embodiment performs training of a discriminator that performs matching between a ground-view image and an aerial-view image (so-called ground-to-aerial cross-view matching). FIG. 1 illustrates the discriminator trained by the training apparatus of the first example embodiment. The discriminator 10 acquires the ground-view image 20 and the aerial-view image 30, and determines whether the ground-view image 20 matches the aerial-view image 30. Note that "a ground-view image matches an aerial-view image" means that a place that is captured in the ground-view image substantially overlaps a place that is captured in the aerial-view image.

The ground-view image 20 is an image including a ground view of a place. For example, the ground-view image 20 is captured by a camera held by a pedestrian or installed in a vehicle on a road. The ground-view image 20 handled by the discriminator 10 has a limited (less than 360-degree) field of view. The aerial-view image 30 is an image including a top view of a place. For example, the aerial-view image 30 is captured by a camera installed in a drone, an air plane, or a satellite.

Since the field of view of the ground-view image 20 is less than 360-degree, a place captured in the ground-view image 20 is a part of a place captured in the aerial-view image 30. Thus, the discriminator 10 acquires a ground-view image 20 and an aerial-view image 30, and determines whether the acquired aerial-view image 30 includes a partial aerial region 40 (i.e. a part of the aerial-view image 30) that matches the acquired ground-view image 20. If the acquired aerial-view image 30 includes a partial aerial region 40 that matches the acquired ground-view image 20, it is determined that the ground-view image 20 matches the aerial-view image 30. On the other hand, if the acquired aerial-view image 30 includes no partial aerial region 40 that matches the acquired ground-view image 20, it is determined that the ground-view image 20 does not match the aerial-view image 30. Note that "a ground-view image matches a partial aerial region" means that a place that is captured in the ground-view image substantially overlaps a place that is captured in the partial aerial region.

Figure 2:
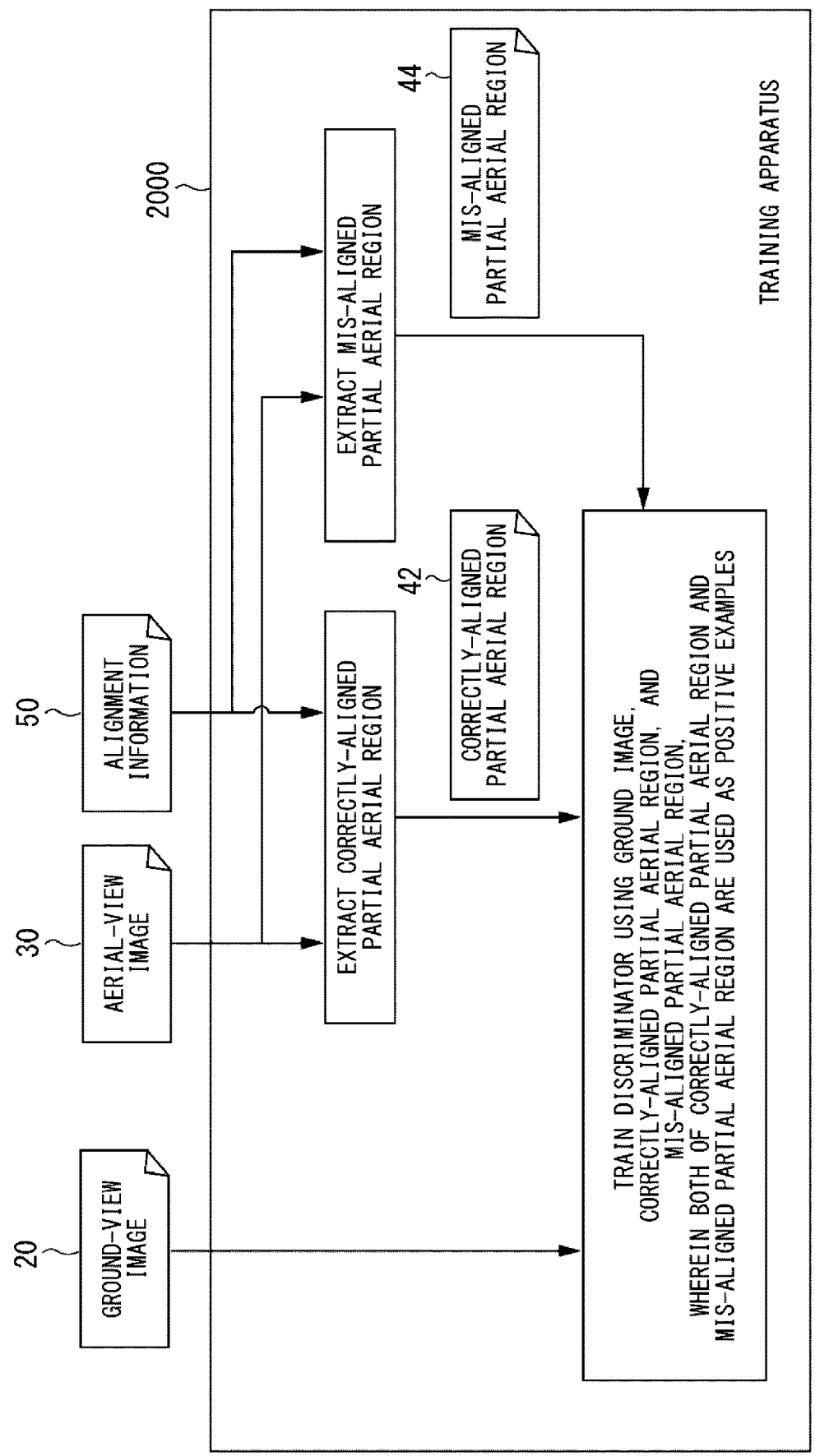
FIG. 2 illustrates an overview of the training apparatus of the first example embodiment.

FIG. 2 illustrates an overview of the training apparatus 2000 of the first example embodiment. In order to train the discriminator 10 that operates as described above, the training apparatus 2000 operates as follows. The training apparatus 2000 acquires the ground-view image 20 and the aerial-view image 30 that includes a partial aerial region 40 that matches the ground-view image 20. In addition, the training apparatus 2000 acquires alignment information 50 that indicates which part of the aerial-view image 30 corresponds to the ground-view image 20. In other words, the alignment information 50 indicates a partial aerial region 40 that corresponds to the ground-view image 20. Hereinafter, the partial aerial region 40 that is indicated by the alignment information 50 is described as being "a correctly-aligned partial aerial region 42". Using this term, it can be rephrased that the alignment information 50 indicates which part of the aerial-view image 30 is to be extracted as the correctly-alignment partial aerial region 42. The correctly-aligned partial aerial region 42 may be the most similar to the ground-view image 20 among the partial aerial regions 40 extracted by the discriminator 10.

The training apparatus 2000 uses the alignment information 50 to extract the correctly-aligned partial aerial region 42 from the aerial-view image 30. In addition, the training apparatus 2000 uses the alignment information 50 to extract a mis-aligned partial aerial region 42 from the aerial-view image 30 as well. The mis-aligned partial aerial region 44 is a partial aerial region that partially overlaps the correctly-aligned partial aerial region 42. FIG. 3 illustrates an example of the correctly-aligned partial aerial region 42 and the mis-aligned partial aerial region 44. The mis-aligned partial aerial region 44 shown in FIG. 3 can be obtained by slightly rotating the correctly-aligned partial aerial region 42.

Conceptually, the training apparatus 2000 trains the discriminator 10 so that it determines not only the correctly-aligned partial aerial region 42 but also the mis-aligned partial aerial region 44 matches the ground-view image 20. To realize this feature, the training apparatus 2000 trains the discriminator 10 using both a set of the ground-view image 20 and the correctly-aligned partial aerial region 42 and a set of the ground-view image 20 and the mis-aligned partial aerial region 44 as training datasets with positive examples of a partial aerial region 40. This means that, in the training of the discriminator 10, the training apparatus 2000 uses both of the correctly-aligned partial aerial region 42 and the mis-aligned partial aerial region 44 as a positive example of a partial aerial region 40. Note that a positive example of a partial aerial region 40 is a partial aerial region 40 that is to be determined to match the ground-view image 20 by the discriminator 10.

<Example of Advantageous Effect>

According to the training apparatus 2000 of the 1st example embodiment, the training apparatus 2000 extracts, from an aerial-view image 30 acquired, not only the correctly-aligned partial aerial region 42 but also the mis-aligned partial aerial region 44, thereby obtaining multiple training datasets from a single aerial-view image 30. This data augmentation facilitates a preparation of training datasets to train the discriminator 10. In addition, by training the discriminator 10 so that it determines that not only the correctly-aligned partial aerial region 42 but also the mis-aligned partial aerial region 44 matches the ground-view image 20, it is possible to make the discriminator 10 tolerant of mis-alignment of a partial aerial region to some extent and to reduce a computational load of the discriminator 10. Regarding this point, further explanations are described later.

Hereinafter, more detailed explanation of the training apparatus 2000 will be described.

<Example of Functional Configuration>

Figure 4:
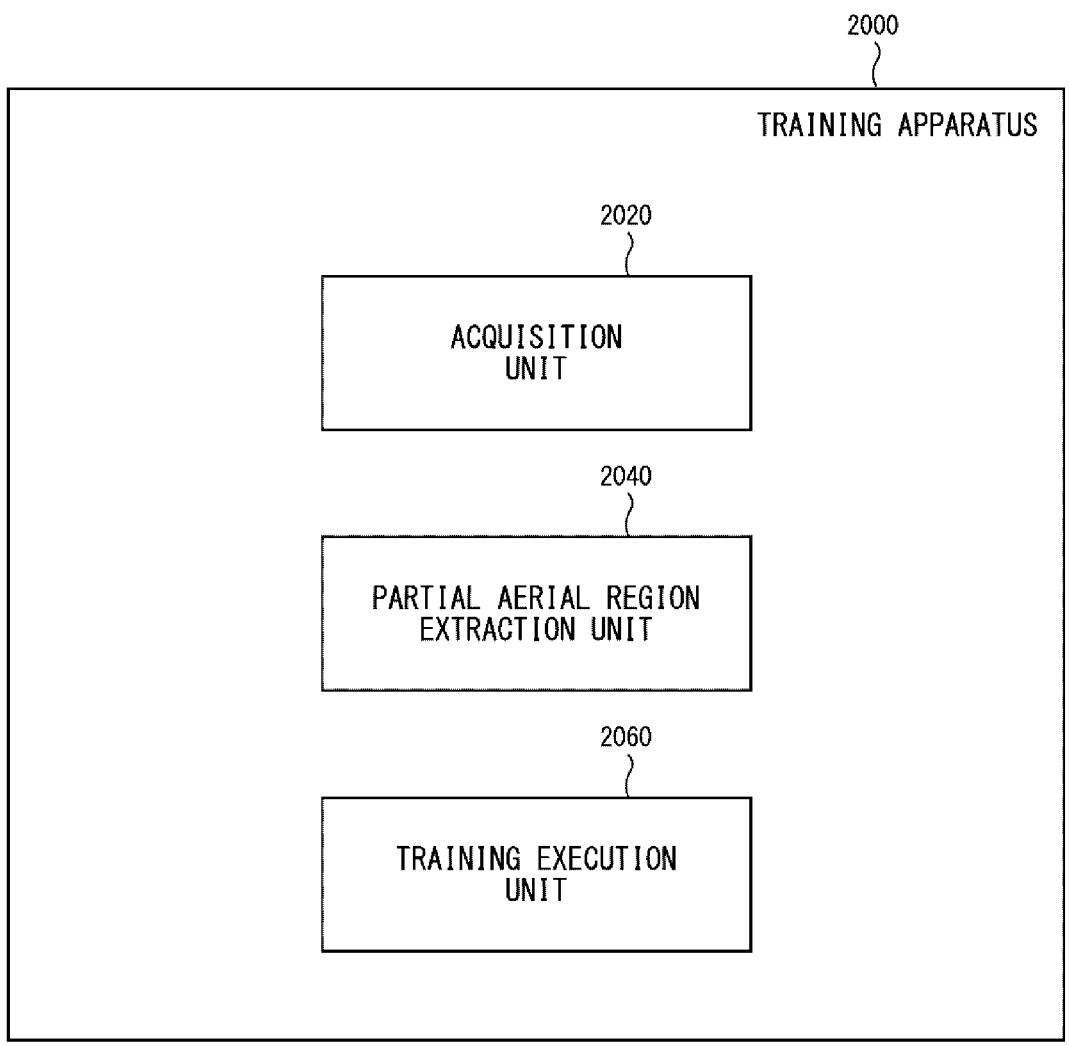
FIG. 4 is a block diagram showing an example of the functional configuration of the training apparatus.

FIG. 4 is a block diagram showing an example of the functional configuration of the training apparatus 2000. The training apparatus 2000 includes an acquisition unit 2020, a partial aerial region extraction unit 2040, and a training execution unit 2060. The acquisition unit 2020 acquires the ground-view image 20, the aerial-view image 30, and the alignment information 50. The partial aerial region extraction unit 2040 extracts the correctly-aligned partial aerial region 42 and the mis-aligned partial aerial region 44 based on the alignment information 50. The training execution unit 2040 executes training of the discriminator 10 using both a set of the ground-view image 20 and the correctly-aligned partial aerial region 42 and a set of the ground-view image 20 and the mis-aligned partial aerial region 44 as training datasets with positive examples of a partial aerial region 40: both the correctly-aligned partial aerial region 42 and the mis-aligned partial aerial region 44 are used as positive examples of a partial aerial region 40.

<Example of Hardware Configuration>

The training apparatus 2000 may be realized by one or more computers. Each of the one or more computers may be a special-purpose computer manufactured for implementing the training apparatus 2000, or may be a general-purpose computer like a personal computer (PC), a server machine, or a mobile device.

The training apparatus 2000 may be realized by installing an application in the computer. The application is implemented with a program that causes the computer to function as the training apparatus 2000. In other words, the program is an implementation of the functional units of the training apparatus 2000.

Figure 5:
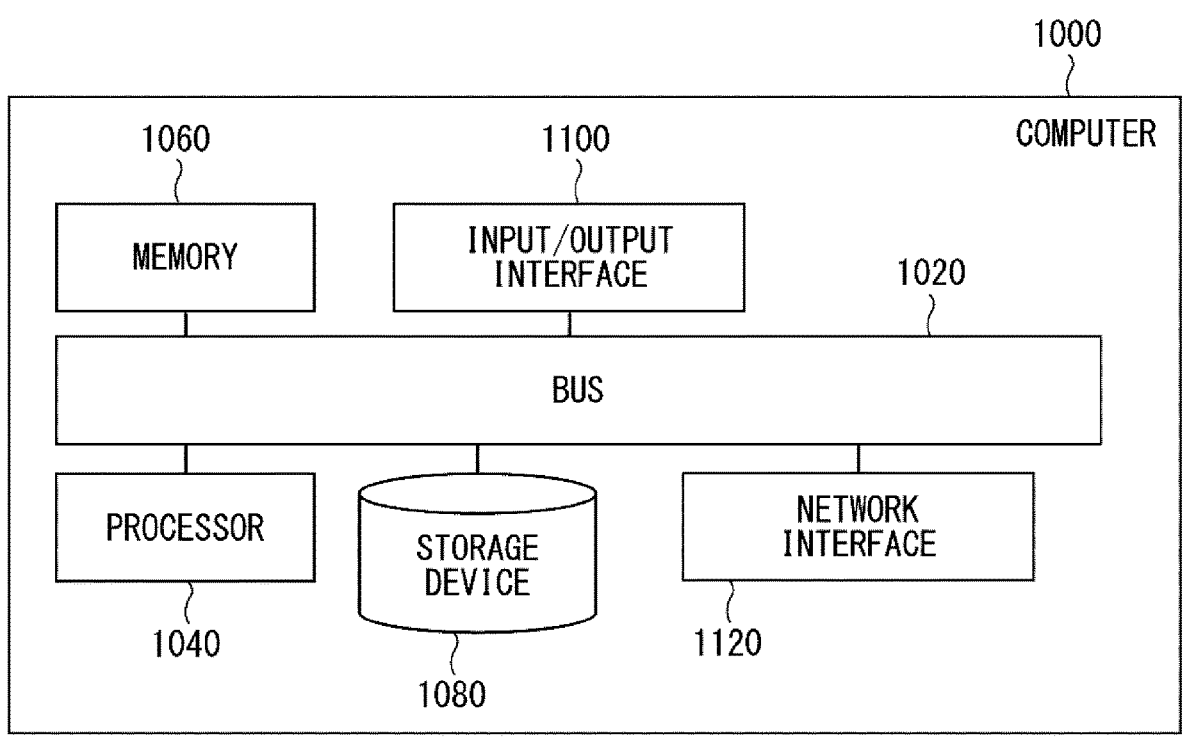
FIG. 5 is a block diagram illustrating an example of a hardware configuration of the image matching apparatus.

FIG. 5 is a block diagram illustrating an example of the hardware configuration of a computer 1000 realizing the training apparatus 2000. In FIG. 5, the computer 1000 includes a bus 1020, a processor 1040, a memory 1060, a storage device 1080, an input/output (I/O) interface 1100, and a network interface 1120.

The bus 1020 is a data transmission channel in order for the processor 1040, the memory 1060, the storage device 1080, and the I/O interface 1100, and the network interface 1120 to mutually transmit and receive data. The processor 1040 is a processor, such as a CPU (Central Processing Unit), GPU (Graphics Processing Unit), or FPGA (Field-Programmable Gate Array). The memory 1060 is a primary memory component, such as a RAM (Random Access Memory) or a ROM (Read Only Memory). The storage device 1080 is a secondary memory component, such as a hard disk, an SSD (Solid State Drive), or a memory card. The I/O interface 1100 is an interface between the computer 1000 and peripheral devices, such as a keyboard, mouse, or display device. The network interface 1120 is an interface between the computer 1000 and a network. The network may be a LAN (Local Area Network) or a WAN (Wide Area Network). The storage device 1080 may store the program mentioned above. The processor 1040 executes the program to realize each functional unit of the training apparatus 2000.

The hardware configuration of the computer 1000 is not restricted to that shown in FIG. 5. For example, as mentioned-above, the training apparatus 2000 may be realized by plural computers. In this case, those computers may be connected with each other through the network.

<Flow of Process>

Figure 6:
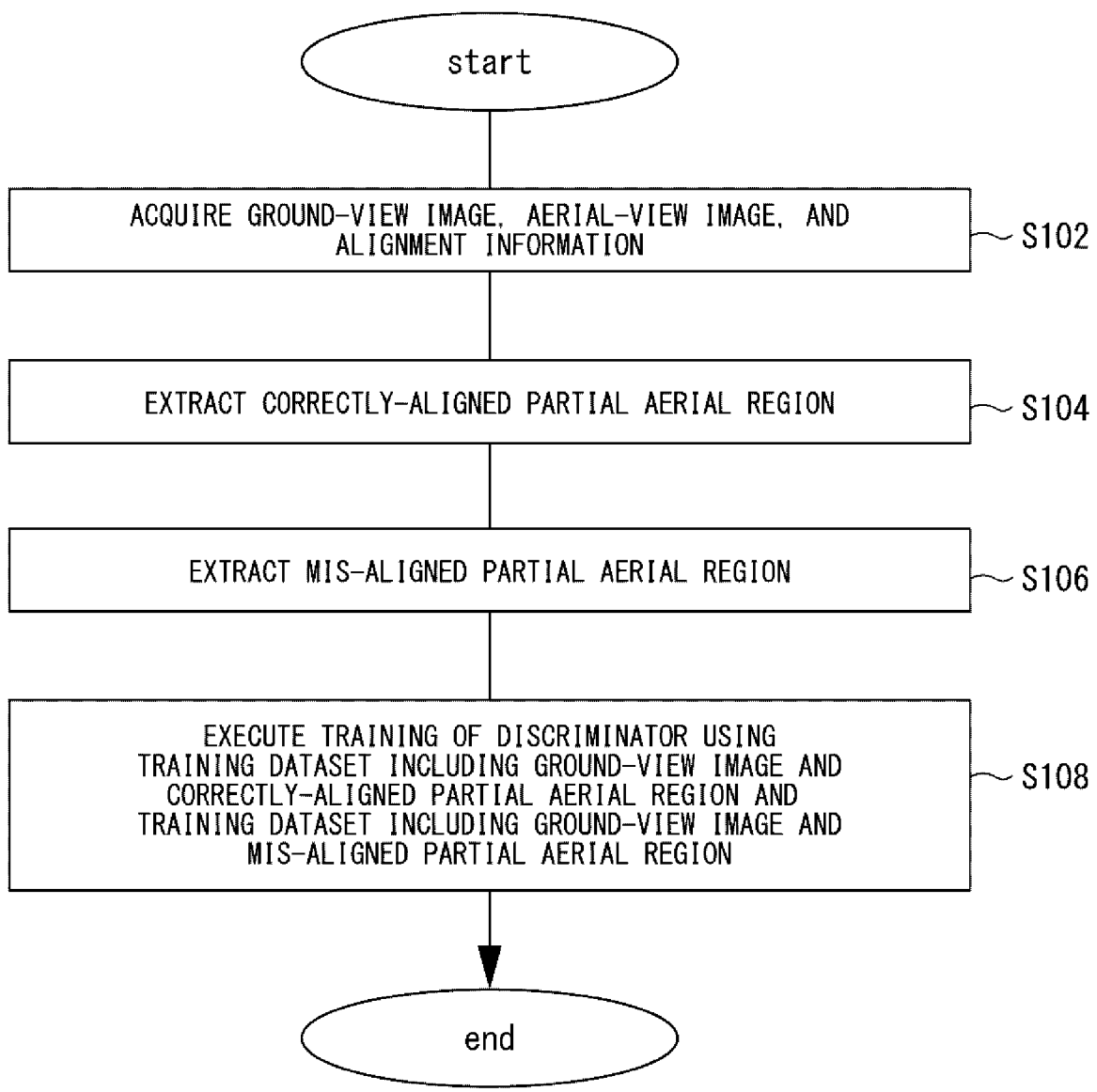
FIG. 6 is a flow diagram illustrating an example flow of processes performed by the training apparatus.

FIG. 6 is a flow diagram illustrating an example flow of processes performed by the training apparatus 2000. The acquisition unit 2020 acquires the ground-view image 20, the aerial-view image, and the alignment information 50 (S102). The partial aerial region extraction unit 2040 extracts the correctly-aligned partial aerial region 42 from the aerial-view image 30 (S104). The partial aerial region extraction unit 2040 extracts the mis-aligned partial aerial region 44 from the aerial-view image 30 (S106). The training execution apparatus 2060 executes a training of the discriminator 10 using a training dataset including the ground-view image 20 and the correctly-aligned partial aerial region 42 and a training dataset including the ground-view image 20 and the mis-aligned partial aerial region 44 (S108).

The flow shown in FIG. 6 is a merely example of a flow of operations performed by the training apparatus 2000, and the flow of operation is not restricted to one shown in FIG. 6. For example, the training apparatus 2000 may perform the extraction of the correctly-aligned partial aerial region 42 and the training of the discriminator 10 using the training dataset including the correctly-aligned partial aerial region 42, and then perform the extraction of the mis-aligned partial aerial region 44 and the training of the discriminator 10 using the training dataset including the mis-aligned partial aerial region 44.

<Example Application of Discriminator 10>

There are various possible applications of the discriminator 10. For example, the discriminator 10 can be used as a part of a system (hereinafter, a geo-localization system) that performs image geo-localization. Image geo-localization is a technique to determine the place at which an input image is captured. Note that, the geo-localization system is merely an example of the application of the discriminator 10, and the application of the discriminator 10 is not restricted to being used in the geo-localization system.

Figure 7:
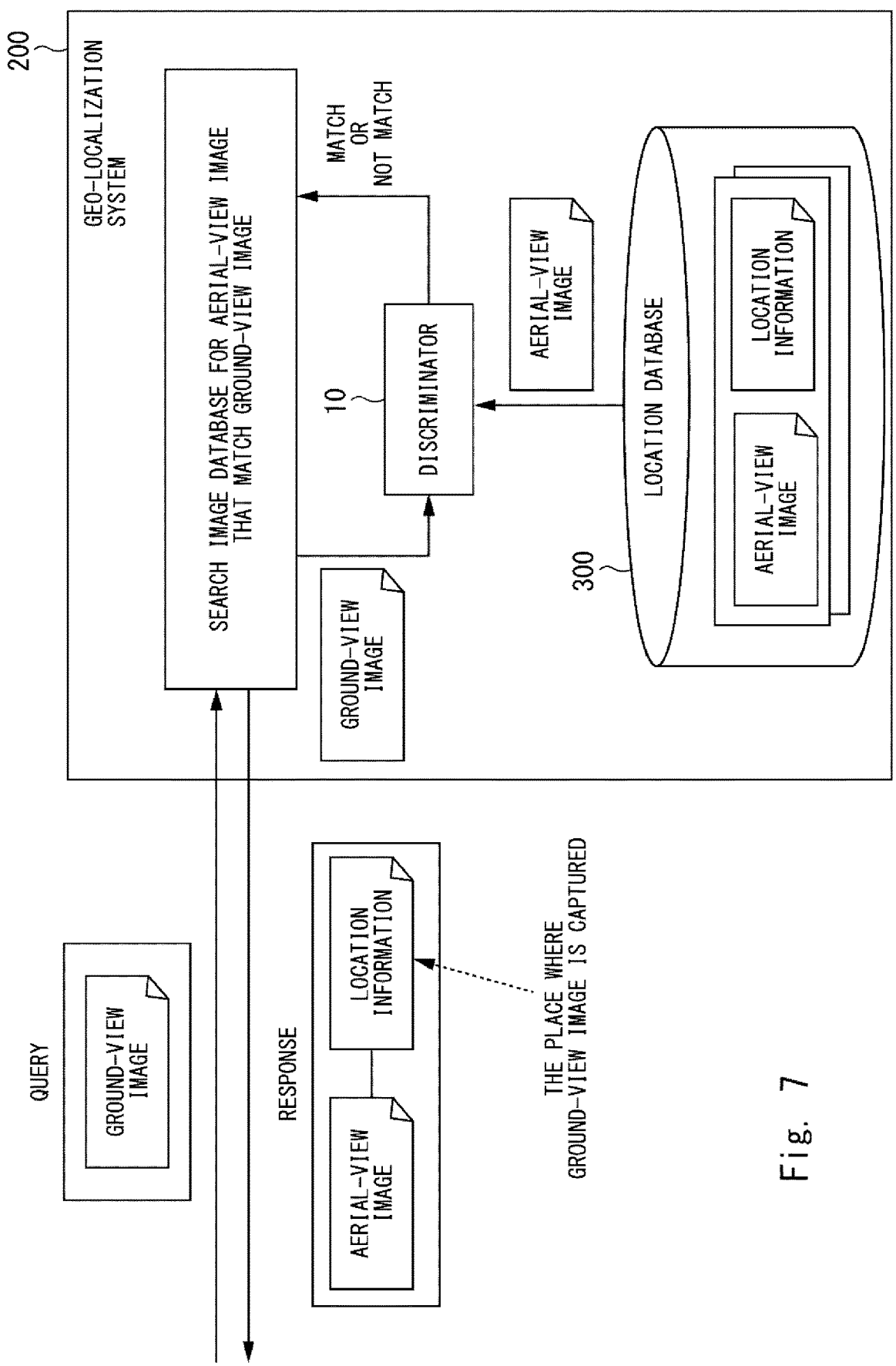
FIG. 7 illustrates a geo-localization system that includes the discriminator.

FIG. 7 illustrates a geo-localization system 200 that includes the discriminator 10. The geo-localization system 200 includes the discriminator 10 and the location database 300. The location database 300 includes a plurality of aerial-view images to each of which location information is attached. An example of the location information may be a GPS (Global Positioning System) coordinate of the place captured in the center of the corresponding aerial-view image.

The geo-localization system 200 receives a query that includes a ground-view image from a client (e.g. user terminal), and searches the location database 300 for the aerial-view image that matches the ground-view image in the received query, thereby determining the place at which the ground-view image is captured. Specifically, until the aerial-view image that matches the ground-view image in the query is detected, the geo-localization system 200 repeatedly executes to: acquire one of the aerial-view images from the location database 300; input the ground-view image and the acquired aerial-view image into the discriminator 10; and determine whether the output of the discriminator 10 indicates that the ground-view image matches the aerial-view image. By doing so, the geo-localization system 200 can find the aerial-view image that includes the place at which the ground-view image is captured. Since the detected aerial-view image is associated with the location information such as the GPS coordinate, the geo-localization system 200 can recognize that where the ground-view image is captured is the place that is indicated by the location information associated with the aerial-view image that matches the ground-view image.

Note that the geo-localization system 200 may be implemented by one or more arbitrary computers such as ones depicted in FIG. 5.

<Detailed Explanation of Discriminator 10>

As described above, the discriminator 10 acquires the ground-view image 20 and the aerial-view image 30, and determines whether the ground-view image 20 matches the aerial-view image 20. Specifically, the discriminator 10 extracts a plurality of partial aerial regions 40 from the aerial-view image 30, and compares each partial aerial region 40 with the ground-view image 20.

For the comparison, the discriminator 10 extracts features from the ground-view image 20 and each partial aerial region 40. Then, for each partial aerial region 40, the discriminator 10 determines whether the features of the partial aerial region 40 is substantially similar to the feature of the ground-view image 20. To do so, the discriminator 10 computes an index (hereinafter, similarity score) indicating a degree of similarity between the features of the ground-view image 20 and those of the partial aerial region 40.

In the case where there is a partial aerial region 40 whose features are substantially similar to the features of the ground-view image 20 (e.g. the similarity score computed for the features of the ground-view image 20 and those of the partial aerial region 40 is equal to or larger than a predefined threshold), the discriminator 10 determines that the ground-view image 20 matches the aerial-view image 30. On the other hand, if there is no partial aerial region 40 whose features are substantially similar to the features of the ground-view image 20, the discriminator 10 determines that the ground-view image 20 does not match the aerial-view image 30.

Figure 8:
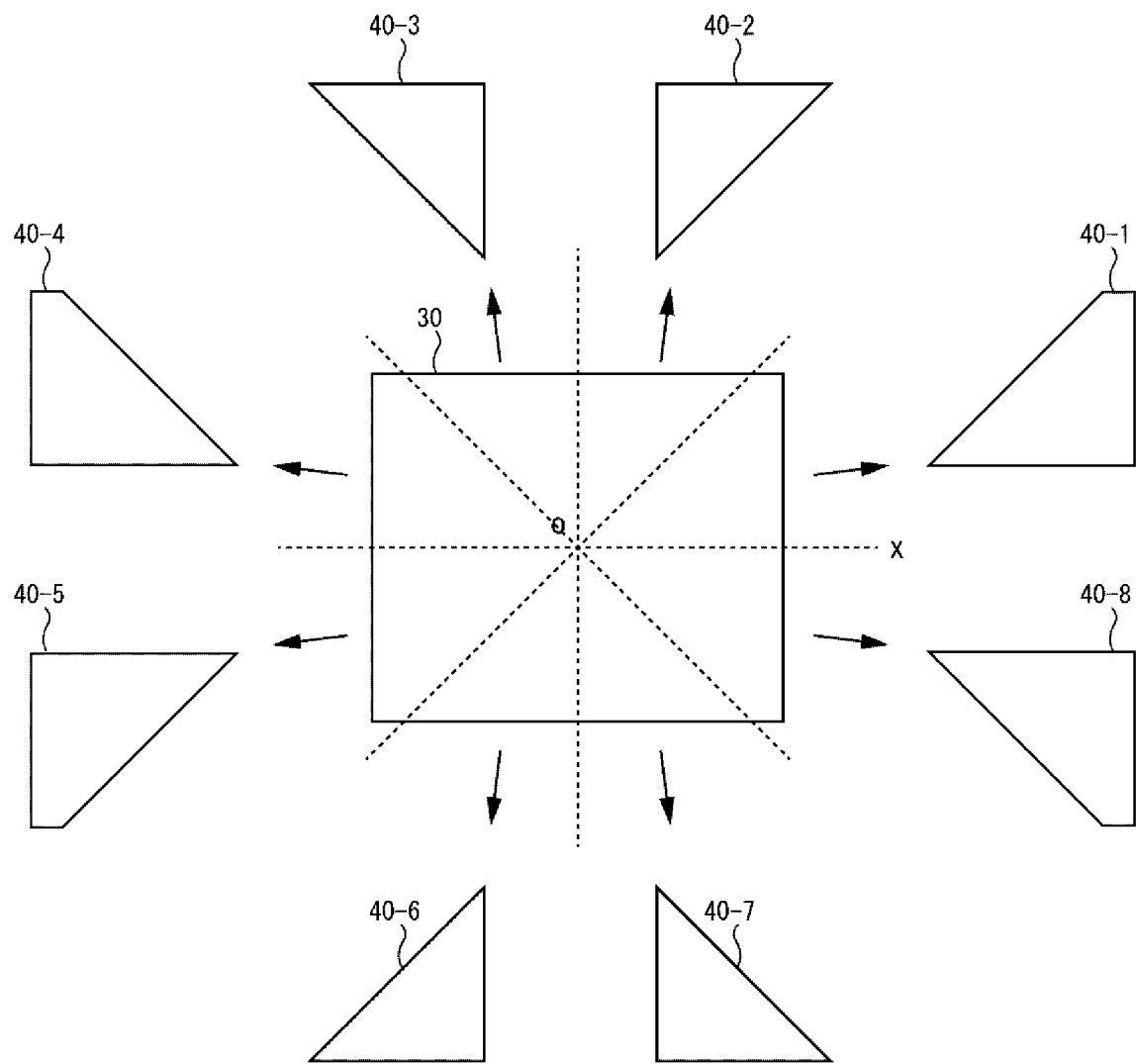
FIG. 8 illustrates the partial aerial regions that are obtained using radial lines.

There are various ways for the discriminator 10 to extract the partial aerial regions 40 from the aerial-view image 30. For example, the discriminator 10 divides the aerial-view image 30 into multiple partial aerial regions 40 using radial lines. FIG. 8 illustrates the partial aerial regions 40 that are obtained using radial lines. In FIG. 8, the center of the aerial-view image 30 is set as the origin, and multiple radial lines are drawn from that origin. In addition, the size of an angle between two radial lines adjacent to each other is 45°. As a result, eight partial aerial regions 40-1 to 40-8 are extracted from the aerial-view image 30.

The size of the angle between two adjacent radial lines may be set in advance, may be specified by a user of the discriminator 10, or may be determined based on the size of the field of view of the ground-view image 20. It is preferable that the size of the angle between two adjacent radial lines is set to be same as the size of the field of view of the ground-view image 20. For example, when the size of the field of view of the ground-view image 20 is 45°, it is preferable that the size of the angle between two adjacent radial lines is set as 45°.

The discriminator 10 may use multiple sizes for the angle between two adjacent radial lines. Suppose that 45° and 60° are used as the angle between two adjacent radial lines. In this case, for example, the discriminator 10 set the angle between two adjacent radial lines as 45° first, and extracts 8 partial aerial regions 40. Next, the discriminator 10 set the angle between two adjacent radial lines as 60°, and extracts 6 partial aerial regions 40. As a result, the discriminator 10 obtains 14 partial aerial regions 40 in total. By employing this way, the discriminator 10 may find the partial aerial regions 40 that matches the ground-view image 20 without knowledge on the field of view of the ground-view image 20.

The discriminator 10 may extracts the partial aerial regions 40 in such a manner that a part of a partial aerial region 40 overlaps a part of one or more other partial aerial regions 40. In this case, for instance, the discriminator 10 may use a sliding window method to define radial lines by which a partial aerial region 40 is extracted from the aerial-view image 30. Hereinafter, two radial lines by which a partial aerial region 40 is extracted from the aerial-view image 30 are described as being "a first radial line" and "a second radial line" respectively. Note that the angle between the first radial line and the x axis is smaller than the angle between the second radial line and the x axis.

In this case, for each partial aerial region 40, the discriminator 10 may define the first radial line and the second radial line as follows:

Equation 1

$$\alpha[i] = i*(s-1) \quad (0 \leq \alpha[i] < 360°)$$

$$\beta[i] = \alpha + w \quad (0 < \beta[i] < 360°) \tag{1}$$

In the equation (1), $\alpha[i]$ represents the angle between the first radial line defining the i-th partial aerial region 40 and the x axis; $\beta$ represents the angle between the second radial line defining the i-th partial aerial region 40 and the x axis; s represents the size of the stride of the sliding window, i.e. the angle between two adjacent partial aerial regions 40; and w represents the size of the sliding window, i.e. the angle between the first radial line and the second radial line.

The smaller the size of the stride is set, the more finely the discriminator 10 can perform the matching between the ground-view image 20 and the partial aerial regions 40. Thus, from the viewpoint of the accuracy of the ground-to-aerial cross-view matching, it is preferable to set a very small number to the stride. However, the reduction of the size of the stride causes larger computational load on the discriminator 10.

The training apparatus 2000 achieves mitigation of this problem by training the discriminator 10 so that it determines the mis-alignment partial aerial region 44 matches the ground-view image 20. By this training, the discriminator 10 becomes to accept mis-alignment of a partial aerial region 40 to some extent. In other words, it is not necessary for the discriminator 10 to extract a perfectly-aligned partial aerial region to determine whether the ground-view image 20 matches the aerial-view image 20. Thus, it is possible to increase the accuracy of the ground-to-aerial view matching performed by the discriminator 10 without setting a very small number to the stride, thereby avoiding causing large computational loads on the discriminator 10.

Figure 9:
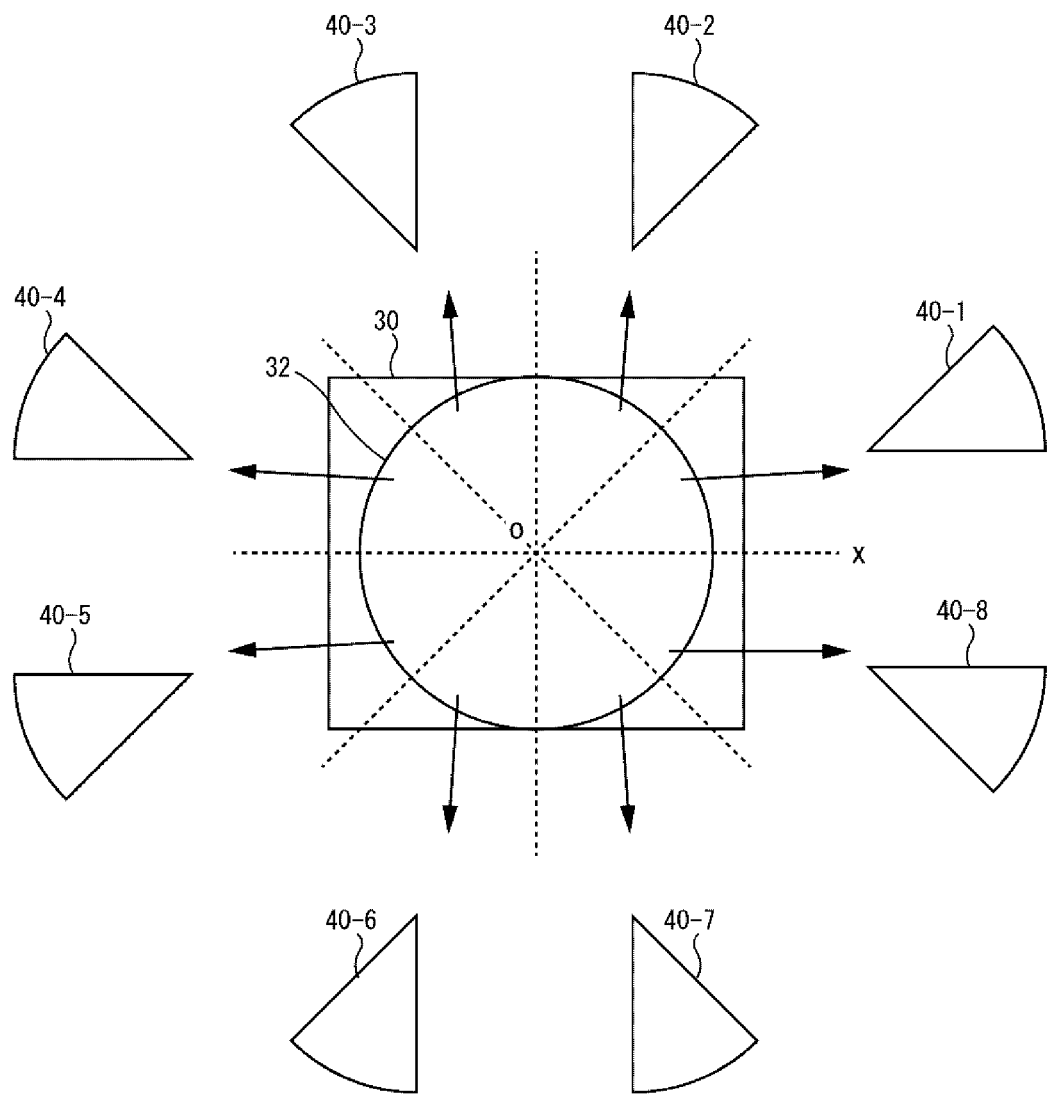
FIG. 9 illustrates the case where the partial aerial regions are extracted from a circular region in an aerial-view image.

Instead of extracting partial aerial regions 40 from a whole of the aerial-view image 30, the discriminator 10 may extract partial aerial regions 40 from a part of the aerial-view image 30. For example, the discriminator 10 crops a circular region out of the aerial-view image 30, and then extracts the plurality of partial aerial regions 40 from the circular region using radial lines. By doing so, it is possible to obtain the plurality of partial aerial regions 40 having the size and shape same as each other. FIG. 9 illustrates the case where the partial aerial regions 42 are extracted from a circular region in the aerial-view image 30. In FIG. 9, the circular region 32 is a circle inscribed in the aerial-view image 30, and its center corresponds to the center of the aerial-view image 30.

The discriminator 10 is formed in a trainable manner. For example, the discriminator 10 includes one or more machine learning-based models each of which includes trainable parameters, such as weights of neural networks. For example, the discriminator 10 has two feature extractors each of which is formed as a machine learning-based model. One of them feeds the ground-view image 20, and outputs the features of the ground-view image 20. The other one of them feeds a partial aerial region 40, and outputs the features of the partial aerial region 40. A feature extraction layer of CNN (Convolutional Neural Network) is an example of the machine learning-based model that can be employed to implement the feature extractors.

<Acquisition of Images and Alignment Information: S102>

The acquisition unit 2020 acquires the ground-view image 20, the aerial-view image 30, and the alignment information 50. There are various ways for the acquisition unit 2020 to obtain those data. For example, a set of the ground-view image 20, the aerial-view image 30, and the alignment information 50 is stored in a storage device in advance. In this case, the acquisition unit 2020 accesses this storage device and reads out the set of the ground-view image 20, the aerial-view image 30, and the alignment information 50. In another example, the set of the ground-view image 20, the aerial-view image 30, and the alignment information 50 are input to the training apparatus 2000 by a user thereof. In another example, the acquisition unit 2020 may receive the set of the ground-view image 20, the aerial-view image 30, and the alignment information 50 that is sent by another apparatus.

The alignment information 50 may indicate which part of the aerial-view image 30 is to be extracted as the correctly-aligned partial aerial region 42 in various manners. For example, the alignment information 50 may indicate the first radial line and the second radial line by which the correctly-aligned partial aerial region 42 can be extracted from the aerial-view image 30. The alignment information 50 may define the first radial line by an angle between the first radial line and the x axis. Similarly, the alignment information 50 may define the second radial line by an angle between the second radial line and the x axis. In another example, the alignment information 50 may define the second radial line by an angle between the first radial line and the second radial line.

<Extraction of Partial Aerial Regions: S104, S106>

The partial aerial region extraction unit 2040 extracts the correctly-aligned partial aerial region 42 and the mis-aligned partial aerial region 44 from the aerial-view image 30 (S104 and S106). Regarding the correctly-aligned partial aerial region 42, the partial aerial region extraction unit 2040 may extract a partial aerial region 40 indicated by the alignment information 50 as the correctly-aligned partial aerial region 42.

Note that the partial aerial region extraction unit 2040 may crop out a part of the aerial-view image 30 and extract the correctly-aligned partial aerial region 42 from the cropped-out region. For example, as illustrated in FIG. 9, the partial aerial region extraction unit 2040 may crop out a circular region that is inscribed in the aerial-view image 30 and whose center corresponds to the center of the aerial-view image 30, and extracts the correctly-aligned partial aerial region 42 from this circular region using the first radial lines and the second radial lines indicated by the alignment information 50. The same can apply to the extraction of the mis-aligned partial aerial region 44.

Regarding the mis-aligned partial aerial region 44, the partial aerial region extraction unit 2040 may compute the first radial line and the second radial line of the mis-aligned partial aerial region 44, by rotating those of the correctly-aligned partial aerial region 42 by a certain rotation angle. The rotation angle (i.e. by what angle the radial lines of the correctly-aligned partial aerial region 42 are to be rotated to obtain the radial lines of the mis-aligned partial aerial region 44) may be defined in advance, may be provided by a user, or may be computed dynamically.

In the first case, the partial aerial region extraction unit 2040 may acquire rotation angle information that indicates the rotation angle. The rotation angle information may be stored in a storage device in advance. The partial aerial region extraction unit 2040 rotates the first radial line and the second radial line of the correctly-aligned partial aerial region 42 by the rotation angle indicated by the rotation angle information, thereby obtaining the first radial line and the second radial line of the mis-aligned partial aerial region 44. Then, the partial aerial region extraction unit 2040 extracts the mis-aligned partial aerial region 44 using the first radial line and the second radial line computed for the mis-aligned partial aerial region 44.

In the case where the rotation angle is provided by a user, the partial aerial region extraction unit 2040 may receive a user input that indicates the rotation angle. The partial aerial region extraction unit 2040 rotates the first radial line and the second radial line of the correctly-aligned partial aerial region 42 by the rotation angle provided by a user, thereby obtaining the first radial line and the second radial line of the mis-aligned partial aerial region 44.

In the case where the rotation angle is determined dynamically, the partial aerial region extraction unit 2040 may compute a random number as the rotation angle. For example, the rotation angle may be sampled from a zero mean Gaussian distribution $N(0,\sigma)$. The standard deviation $\sigma$ may be stored in a storage device in advance or provided by a user. The partial aerial region extraction unit 2040 rotates the first radial line and the second radial line of the correctly-aligned partial aerial region 42 by the rotation angle that is randomly determined, thereby obtaining the first radial line and the second radial line of the mis-aligned partial aerial region 44. Note that sampling a random number as the rotation angle is effective to prevent the discriminator 10 from overfitting to the training data.

The partial aerial region extraction unit 2040 may extract a plurality of mis-aligned partial aerial regions 44 using a plurality of the rotation angles that are different from each other. In the case where the rotation angles are defined in advance, the partial aerial region extraction unit 2040 may acquire the rotation angle information that indicates the plurality of the rotation angles. The partial aerial region extraction unit 2040 obtains a mis-aligned partial aerial region 44 for each rotation angle indicated by the rotation angle information, thereby obtaining the plurality of the mis-aligned partial aerial regions 44.

In the case where the rotation angles are provided by a user, the partial aerial region extraction unit 2040 may acquire a user input that indicates the plurality of the rotation angles. The partial aerial region extraction unit 2040 obtains a mis-aligned partial aerial region 44 for each rotation angle indicated by the user input, thereby obtaining the plurality of the mis-aligned partial aerial regions 44.

In the case where the rotation angles are computed dynamically, the partial aerial region extraction unit 2040 may compute a plurality of random numbers as the rotation angles. Suppose that the number of the mis-aligned partial aerial regions 44 to be extracted is M. In this case, the partial aerial region extraction unit 2040 samples a random value from the Gaussian distribution M times, thereby obtaining M rotation angles. The partial aerial region extraction unit 2040 obtains a mis-aligned partial aerial region 44 for each of the M rotation angles sampled, thereby obtaining M mis-aligned partial aerial regions 44.

<Execution of Training of Discriminator 10: S108>

The training execution unit 2060 executes training of the discriminator 10 using the correctly-aligned partial aerial region 42 and the mis-aligned partial aerial region 44. Conceptually, the discriminator 10 is trained so that it determines that not only the correctly-aligned partial aerial region 42 but also the mis-aligned partial aerial region 44 matches the ground-view image 20. For this reason, the training execution unit 2060 executes training of the discriminator 10 using both the correctly-aligned partial aerial region 42 and the mis-aligned partial aerial region 44 as positive examples.

For example, the training execution unit 2060 inputs a set of the ground-view image 20 and the correctly-aligned partial aerial region 42, and obtains the similarity score that indicates a degree of similarity between the features of the ground-view image 20 and those of the correctly-aligned partial aerial region 42. Then, the training execution unit 2060 computes a loss based on the similarity score obtained, and updates the trainable parameters (e.g. weights of a neural network) of the discriminator 10 in such a manner that the loss is reduced. Note that there are various well-known ways to update trainable parameters of a machine learning-based model based on a computed loss, and any one of them can be employed to train the discriminator 10.

The same can apply to a training of the discriminator using the mis-aligned partial aerial region 44. Specifically, the training execution unit 2060 inputs a set of the ground-view image 20 and the mis-aligned partial aerial region 44, and obtains the similarity score that indicates a degree of similarity between the features of the ground-view image 20 and those of the mis-aligned partial aerial region 44. Then, the training execution unit 2060 computes a loss based on the similarity score obtained, and updates the trainable parameters of the discriminator 10 in such a manner that the loss is reduced.

A negative example of a partial aerial region may also be used to train the discriminator 10. For example, the training execution unit 2060 may use a set of the ground-view image 20, a positive example of a partial aerial region 40, and a negative example of a partial aerial region 40. The correctly-aligned partial aerial region 42 and the mis-aligned partial aerial regions 44 are used as positive examples, whereas other partial aerial regions are used as negative examples. Note that the aerial-view image 30 from which a negative example of a partial aerial region 40 is extracted may be the same as or different from the aerial-view 30 from which the correctly-aligned partial aerial region 42 and the mis-aligned partial aerial region 44 are extracted. In the former case, negative examples of a partial aerial region 40 are partial aerial regions 40 that do not overlap the correctly-aligned aerial region 42. In the latter case, the acquisition unit 2020 may acquire one or more negative examples of a partial aerial region 40 or acquire one or more additional aerial-view images 30 from which the training execution unit 2060 may extract one or more negative examples of a partial aerial region 40.

There are various ways to train the discriminator 10 using a negative example. For example, the training execution unit 2060 may compute a triplet loss to train the discriminator 10. Specifically, the training execution unit 2060 inputs the ground-view image 20 and the positive example of a partial aerial region 40 in the same set as each other, and obtains the similarity score for them. In addition, the training execution unit 2060 inputs the ground-view image 20 and the negative example of a partial aerial region 40 in the same set as each other, and obtains the similarity score for them. Then, the training execution unit 2060 computes a triplet loss using the similarity score computed for the ground-view image 20 and the positive example of a partial aerial region 40 and the similarity score computed for the ground-view image 20 and the negative example of a partial aerial region 40, and updates the trainable parameters of the discriminator 10 based on the computed triplet loss. Note that there are well-known ways to update trainable parameters of a machine learning-based model based on a computed triplet loss, and any one of them can be employed to train the discriminator 10.

<Output from Training Apparatus 2000>

The training apparatus 2000 may output some data (hereinafter, output information) obtained as a result of the training of the discriminator 10. For example, the output information may include the training parameters of the discriminator 10 that are obtained as the result of the training of the discriminator 10. By configuring with the discriminator 10 with the trainable parameters output from the training apparatus 2000, it is possible to obtain the discriminator 10 that can determine not only the correctly-aligned partial aerial region 42 but also mis-aligned partial aerial regions 44 matches the ground-view image 20. In another example, the output information may include a whole of the discriminator 10, e.g. a set of a program implementing the discriminator 10, non-trainable parameters thereof, and the trainable parameters thereof that has been updated by the training apparatus 2000.

There are various ways for the training apparatus 2000 to output the output information. For example, the training apparatus 2000 may put the output information into a storage device. In another example, the training apparatus 2000 may output the output information to a display device so that the display device displays the contents of the output information. In another example, the training apparatus 2000 may output the output information to another computer, such as one included in the geo-localization system 200 shown in FIG. 7.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

The whole or part of the example embodiments disclosed above can be described as, but not limited to, the following supplementary notes.

<Supplementary Notes>

(Supplementary Note 1)

A training apparatus comprising:
at least one processor; and
memory storing instructions,
wherein the at least one processor is configured to execute the instructions to:
acquire a ground-view image whose field of view is less than 360 degree, an aerial-view image, and alignment information; and
train a discriminator that determines whether or not the ground-view image matches the aerial-view image, the discriminator extracting a plurality of partial aerial regions from the aerial-view image and determining that the ground-view image matches the aerial-view image when there is the partial aerial region that matches the ground-view image,
wherein the training of the discriminator includes:
extracting a correctly-aligned partial aerial region and a mis-aligned partial aerial region from the aerial-view image, the correctly-aligned partial aerial region being the partial aerial region that is indicated by the alignment information and that corresponds to the ground-view image, the mis-aligned partial aerial region being the partial aerial region partially overlapping the correctly-aligned partial aerial region;
training the discriminator using a set of the ground-view image and the correctly-aligned partial aerial region and a set of the ground-view image and the mis-aligned partial aerial region, both the correctly-aligned partial aerial region and the mis-aligned partial aerial region being used as positive examples of the partial aerial region.

(Supplementary Note 2)

The training apparatus according to supplementary note 1, wherein
the alignment information indicates a first radial line and a second radial line,
the extraction of the correctly-aligned partial aerial region includes extracting a region between the first line and the second line in the aerial-view image as the correctly-aligned partial aerial region, and
the extraction of the mis-aligned partial aerial region includes:
rotating the first radial line and the second radial line; and
extracting a region between the rotated first line and the rotated second line in the aerial-view image as the mis-aligned partial aerial region.

(Supplementary Note 3)

The training apparatus according to supplementary note 2, wherein
the extraction of the mis-aligned partial aerial region includes sampling a value from a probability distribution, and
the first radial line and the second radial line are rotated by an angle that is determined by the sampled value.

(Supplementary Note 4)

The training apparatus according to supplementary note 3, wherein
the probability distribution is a zero mean Gaussian distribution.

(Supplementary Note 5)

The training apparatus according to any one of supplementary notes 1 to 4, wherein
the at least one processor is further configured to extract a circular region from the aerial-view image, and
the correctly-aligned partial aerial region and the mis-aligned partial aerial region are extracted from the circular region.

(Supplementary Note 6)

A control method performed by a computer, comprising:
acquiring a ground-view image whose field of view is less than 360 degree, an aerial-view image, and alignment information; and
training a discriminator that determines whether or not the ground-view image matches the aerial-view image, the discriminator extracting a plurality of partial aerial regions from the aerial-view image and determining that the ground-view image matches the aerial-view image when there is the partial aerial region that matches the ground-view image,
wherein the training of the discriminator includes:
extracting a correctly-aligned partial aerial region and a mis-aligned partial aerial region from the aerial-view image, the correctly-aligned partial aerial region being the partial aerial region that is indicated by the alignment information and that corresponds to the ground-view image, the mis-aligned partial aerial region being the partial aerial region partially overlapping the correctly-aligned partial aerial region;
training the discriminator using a set of the ground-view image and the correctly-aligned partial aerial region and a set of the ground-view image and the mis-aligned partial aerial region, both the correctly-aligned partial aerial region and the mis-aligned partial aerial region being used as positive examples of the partial aerial region.

(Supplementary Note 7)

The control method according to supplementary note 6, wherein
the alignment information indicates a first radial line and a second radial line,
the extraction of the correctly-aligned partial aerial region includes extracting a region between the first line and the second line in the aerial-view image as the correctly-aligned partial aerial region, and
the extraction of the mis-aligned partial aerial region includes:
rotating the first radial line and the second radial line; and extracting a region between the rotated first line and the rotated second line in the aerial-view image as the mis-aligned partial aerial region.

(Supplementary Note 8)

The control method according to supplementary note 7, wherein the extraction of the mis-aligned partial aerial region includes sampling a value from a probability distribution, and the first radial line and the second radial line are rotated by an angle that is determined by the sampled value.

(Supplementary Note 9)

The control method according to supplementary note 8, wherein the probability distribution is a zero mean Gaussian distribution.

(Supplementary Note 10)

The control method according to any one of supplementary notes 6 to 9, further comprising:

extracting a circular region from the aerial-view image, wherein the correctly-aligned partial aerial region and the mis-aligned partial aerial region are extracted from the circular region.

(Supplementary Note 11)

A non-transitory computer-readable storage medium storing a program that causes a computer to execute:

acquiring a ground-view image whose field of view is less than 360 degree, an aerial-view image, and alignment information; and training a discriminator that determines whether or not the ground-view image matches the aerial-view image, the discriminator extracting a plurality of partial aerial regions from the aerial-view image and determining that the ground-view image matches the aerial-view image when there is the partial aerial region that matches the ground-view image, wherein the training of the discriminator includes:

extracting a correctly-aligned partial aerial region and a mis-aligned partial aerial region from the aerial-view image, the correctly-aligned partial aerial region being the partial aerial region that is indicated by the alignment information and that corresponds to the ground-view image, the mis-aligned partial aerial region being the partial aerial region partially overlapping the correctly-aligned partial aerial region;

training the discriminator using a set of the ground-view image and the correctly-aligned partial aerial region and a set of the ground-view image and the mis-aligned partial aerial region, both the correctly-aligned partial aerial region and the mis-aligned partial aerial region being used as positive examples of the partial aerial region.

(Supplementary Note 12)

The storage medium according to supplementary note 11, wherein the alignment information indicates a first radial line and a second radial line, the extraction of the correctly-aligned partial aerial region includes extracting a region between the first line and the second line in the aerial-view image as the correctly-aligned partial aerial region, and the extraction of the mis-aligned partial aerial region includes:

rotating the first radial line and the second radial line; and extracting a region between the rotated first line and the rotated second line in the aerial-view image as the mis-aligned partial aerial region.

(Supplementary Note 13)

The storage medium according to supplementary note 12, wherein the extraction of the mis-aligned partial aerial region includes sampling a value from a probability distribution, and the first radial line and the second radial line are rotated by an angle that is determined by the sampled value.

(Supplementary Note 14)

The storage medium according to supplementary note 13, wherein the probability distribution is a zero mean Gaussian distribution.

(Supplementary Note 15)

The storage medium according to any one of supplementary notes 11 to 14, wherein the program further causes the compute to extract a circular region from the aerial-view image, and the correctly-aligned partial aerial region and the mis-aligned partial aerial region are extracted from the circular region.

REFERENCE SIGNS LIST

10 discriminator
20 ground-view image
30 aerial-view image
32 circular region
40 partial aerial region
42 correctly-aligned partial aerial region
44 mis-aligned partial aerial region
50 alignment information
200 geo-localization system
300 location database
1000 computer
1020 bus
1040 processor
1060 memory
1080 storage device
1100 input/output interface
1120 network interface
2000 training apparatus
2020 acquisition unit
2040 partial aerial region extraction unit
2060 training execution unit

What is claimed is:

1. A training apparatus comprising:

at least one memory that is configured to store instructions; and at least one processor that is configured to execute the instructions to:

acquire a ground-view image whose field of view is less than 360 degree, an aerial-view image, and alignment information; and train a discriminator that determines whether or not the ground-view image matches the aerial-view image, the discriminator extracting a plurality of partial aerial regions from the aerial-view image and determining that the ground-view image matches the aerial-view image when there is the partial aerial region that matches the ground-view image, wherein the training of the discriminator includes:

extracting a correctly-aligned partial aerial region and a mis-aligned partial aerial region from the aerial-view image, the correctly-aligned partial aerial region being the partial aerial region that is indicated by the alignment information and that corresponds to the ground-view image, the mis-aligned partial aerial region being the partial aerial region partially overlapping the correctly-aligned partial aerial region;

training the discriminator using a set of the ground-view image and the correctly-aligned partial aerial region and a set of the ground-view image and the mis-aligned partial aerial region, both the correctly-aligned partial aerial region and the mis-aligned partial aerial region being used as positive examples of the partial aerial region.

2. The training apparatus according to claim 1, wherein the alignment information indicates a first radial line and a second radial line, the extraction of the correctly-aligned partial aerial region includes extracting a region between the first line and the second line in the aerial-view image as the correctly-aligned partial aerial region, and the extraction of the mis-aligned partial aerial region includes:
 rotating the first radial line and the second radial line; and
 extracting a region between the rotated first line and the rotated second line in the aerial-view image as the mis-aligned partial aerial region.

3. The training apparatus according to claim 2, wherein the extraction of the mis-aligned partial aerial region includes sampling a value from a probability distribution, and the first radial line and the second radial line are rotated by an angle that is determined by the sampled value.

4. The training apparatus according to claim 3, wherein the probability distribution is a zero mean Gaussian distribution.

5. The training apparatus according to claim 1, wherein the at least one processor is further configured to extract a circular region from the aerial-view image, and the correctly-aligned partial aerial region and the mis-aligned partial aerial region are extracted from the circular region.

6. A control method performed by a computer, comprising:

acquiring a ground-view image whose field of view is less than 360 degree, an aerial-view image, and alignment information; and training a discriminator that determines whether or not the ground-view image matches the aerial-view image, the discriminator extracting a plurality of partial aerial regions from the aerial-view image and determining that the ground-view image matches the aerial-view image when there is the partial aerial region that matches the ground-view image, wherein the training of the discriminator includes:
 extracting a correctly-aligned partial aerial region and a mis-aligned partial aerial region from the aerial-view image, the correctly-aligned partial aerial region being the partial aerial region that is indicated by the alignment information and that corresponds to the ground-view image, the mis-aligned partial aerial region being the partial aerial region partially overlapping the correctly-aligned partial aerial region;
 training the discriminator using a set of the ground-view image and the correctly-aligned partial aerial region and a set of the ground-view image and the mis-aligned partial aerial region, both the correctly-aligned partial aerial region and the mis-aligned partial aerial region being used as positive examples of the partial aerial region.

7. The control method according to claim 6, wherein the alignment information indicates a first radial line and a second radial line, the extraction of the correctly-aligned partial aerial region includes extracting a region between the first line and the second line in the aerial-view image as the correctly-aligned partial aerial region, and the extraction of the mis-aligned partial aerial region includes:
 rotating the first radial line and the second radial line; and
 extracting a region between the rotated first line and the rotated second line in the aerial-view image as the mis-aligned partial aerial region.

8. The control method according to claim 7, wherein the extraction of the mis-aligned partial aerial region includes sampling a value from a probability distribution, and the first radial line and the second radial line are rotated by an angle that is determined by the sampled value.

9. The control method according to claim 8, wherein the probability distribution is a zero mean Gaussian distribution.

10. The control method according to claim 6, further comprising:

extracting a circular region from the aerial-view image, wherein the correctly-aligned partial aerial region and the mis-aligned partial aerial region are extracted from the circular region.

11. A non-transitory computer-readable storage medium storing a program that causes a computer to execute:

acquiring a ground-view image whose field of view is less than 360 degree, an aerial-view image, and alignment information; and training a discriminator that determines whether or not the ground-view image matches the aerial-view image, the discriminator extracting a plurality of partial aerial regions from the aerial-view image and determining that the ground-view image matches the aerial-view image when there is the partial aerial region that matches the ground-view image, wherein the training of the discriminator includes:
 extracting a correctly-aligned partial aerial region and a mis-aligned partial aerial region from the aerial-view image, the correctly-aligned partial aerial region being the partial aerial region that is indicated by the alignment information and that corresponds to the ground-view image, the mis-aligned partial aerial region being the partial aerial region partially overlapping the correctly-aligned partial aerial region;
 training the discriminator using a set of the ground-view image and the correctly-aligned partial aerial region and a set of the ground-view image and the mis-aligned partial aerial region, both the correctly-aligned partial aerial region and the mis-aligned partial aerial region being used as positive examples of the partial aerial region.

12. The storage medium according to claim 11, wherein the alignment information indicates a first radial line and a second radial line, the extraction of the correctly-aligned partial aerial region includes extracting a region between the first line and the second line in the aerial-view image as the correctly-aligned partial aerial region, and the extraction of the mis-aligned partial aerial region includes:
rotating the first radial line and the second radial line; and
extracting a region between the rotated first line and the rotated second line in the aerial-view image as the mis-aligned partial aerial region.

13. The storage medium according to claim 12, wherein the extraction of the mis-aligned partial aerial region includes sampling a value from a probability distribution, and
the first radial line and the second radial line are rotated by an angle that is determined by the sampled value.

14. The storage medium according to claim 13, wherein the probability distribution is a zero mean Gaussian distribution.

15. The storage medium according to claim 11, wherein the program further causes the compute to extract a circular region from the aerial-view image, and
the correctly-aligned partial aerial region and the mis-aligned partial aerial region are extracted from the circular region.

\* \* \* \* \*